(12) United States Patent
Storz et al.

(10) Patent No.: US 7,973,704 B2
(45) Date of Patent: Jul. 5, 2011

(54) HANDHELD RADAR

(75) Inventors: Gregor Wolfgang Storz, Auckland (NZ); Robert Andrew Carr Shepheard, Auckland (NZ)

(73) Assignee: Navman New Zealand, Auckland (NZ)

( * ) Notice: Subject to any disclaimer, the term of this patent is extended or adjusted under 35 U.S.C. 154(b) by 167 days.

(21) Appl. No.: 12/094,635

(22) PCT Filed: Nov. 22, 2006

(86) PCT No.: PCT/NZ2006/000308
§ 371 (c)(1),
(2), (4) Date: Oct. 1, 2008

(87) PCT Pub. No.: WO2007/061322
PCT Pub. Date: May 31, 2007

(65) Prior Publication Data
US 2009/0167593 A1   Jul. 2, 2009

(30) Foreign Application Priority Data

Nov. 22, 2005   (NZ) ..................... 543742

(51) Int. Cl.
*G01S 13/04*   (2006.01)
*G01S 13/86*   (2006.01)
*G01S 7/04*   (2006.01)
*G01S 13/00*   (2006.01)

(52) U.S. Cl. .......... 342/175; 342/27; 342/118; 342/146; 342/147; 342/176; 342/182; 342/195

(58) Field of Classification Search .......... 342/21–24, 342/27, 28, 82–103, 175, 176, 179, 182, 342/42–51, 118–147, 70–72, 192–197; 340/500, 340/531, 539.1, 539.11–539.13
See application file for complete search history.

(56) References Cited

U.S. PATENT DOCUMENTS

| | | | |
|---|---|---|---|
| 3,735,402 A | 5/1973 | Mosher | |
| 4,053,881 A | 10/1977 | Dahl | |
| 4,307,398 A * | 12/1981 | Ward, Jr. | .......... 342/92 |
| 4,588,992 A | 5/1986 | Clark | |
| 4,730,190 A * | 3/1988 | Win et al. | .......... 342/118 |

(Continued)

FOREIGN PATENT DOCUMENTS

EP   0638820   2/1995

(Continued)

OTHER PUBLICATIONS

International Search Report dated Feb. 7, 2007 (PCT/NZ06/00308).

*Primary Examiner* — Bernarr E Gregory
(74) *Attorney, Agent, or Firm* — Banner & Witcoff, Ltd.

(57) ABSTRACT

The present invention relates to a handheld radar apparatus. The apparatus comprises an antenna (22,23) adapted to transmit and receive electromagnetic signals, a direction sensor (24, 25) that outputs an orientation signal indicative of the orientation of the antenna, and a radar (21) coupled to the antenna (22, 23), the radar (21) adapted to generate an electromagnetic signal for transmission via the antenna (22, 23), and adapted to receive a reflected version of the electromagnetic signal via the antenna (22, 23) reflected from an object. The radar (21) comprises a processor (30) for generating location information indicative of the location of the object using the received reflected electromagnetic signal and the orientation of the antenna (22,23) as indicated by the orientation signal, and a screen (4) adapted to display indicia (e.g. 43*a* to 43*c*) representing the object and its location based on the location information.

13 Claims, 4 Drawing Sheets

U.S. PATENT DOCUMENTS

| | | | |
|---|---|---|---|
| 5,274,378 A * | 12/1993 | O'Conner | 342/23 |
| 5,345,240 A * | 9/1994 | Frazier | 342/28 |
| 5,432,515 A * | 7/1995 | O'Conner | 342/23 |
| 5,662,534 A | 9/1997 | Kroll et al. | |
| 5,818,381 A * | 10/1998 | Williams | 342/24 |
| 5,973,618 A * | 10/1999 | Ellis | 342/24 |
| 6,104,337 A * | 8/2000 | Coutts et al. | 342/125 |
| 6,359,582 B1 | 3/2002 | MacAleese | |
| 6,462,696 B1 | 10/2002 | Gorman | |
| 6,620,057 B1 * | 9/2003 | Pirritano et al. | 342/51 |
| 6,950,054 B1 * | 9/2005 | Steinway et al. | 342/22 |
| 7,209,035 B2 * | 4/2007 | Tabankin et al. | 340/539.11 |
| 7,518,542 B1 * | 4/2009 | Steinway et al. | 342/22 |

FOREIGN PATENT DOCUMENTS

| | | |
|---|---|---|
| GB | 1316956 | 5/1973 |
| GB | 2343805 | 5/2000 |
| WO | 2005081015 | 9/2005 |

* cited by examiner

HANDHELD RADAR

FIELD OF THE INVENTION

The present invention relates to radar apparatus for imaging an area and a method for its use.

BACKGROUND OF THE INVENTION

Radar is a valuable collision avoidance and navigation tool, typically used on vessels large enough to carry the required transmission and reception equipment. It is typically used by ocean going and coastal vessels to assist their navigation in fog and in the dark and to avoid collisions.

There are many other situations in which use of radar equipment would be beneficial, but due to the cost, complexity and size of the required equipment, generally it is not feasible to utilise radar. For example, small boats do not have the space to fit the antenna, nor the capacity for a suitable power source. There would be a range of new applications for radar if the installation and operation of radar was more practicable.

SUMMARY OF THE INVENTION

It is an object of the present invention to provide a handheld radar apparatus. This would provide the ability to utilise radar in range of situations for which current radar equipment is not suitable.

In one aspect the present invention may be said to consist in a handheld radar apparatus comprising: an antenna adapted to transmit and receive electromagnetic signals, a direction sensor that outputs an orientation signal indicative of the orientation of the antenna, a radar coupled to the antenna, the radar adapted to generate an electromagnetic signal for transmission via the antenna, and adapted to receive a reflected version of the electromagnetic signal via the antenna reflected from an object, the radar comprising a processor for generating location information indicative of the location of the object using the received reflected electromagnetic signal and the orientation of the antenna as indicated by the orientation signal, and a screen adapted to display indicia representing the object and its location based on the location information, wherein the direction sensor comprises a fluxgate compass adapted to obtain a first measure indicative of the orientation of the antenna, and a rate gyroscope adapted to obtain a second measure indicative of the orientation of the antenna, wherein the fluxgate compass and rate gyroscope in combination provide an orientation signal that adapts to rapid movements of the handheld radar by a user.

Preferably, a handheld radar apparatus according to claim 1 wherein the first measure obtained by the fluxgate compass is indicative of the absolute orientation of the antenna, and the second measure obtained by the rate gyroscope is indicative of the relative orientation of the antenna, wherein the second measure obtained by the rate gyroscope compensates for errors in the first measure indicative of the absolute orientation of the antenna due to lag in the fluxgate compass.

Preferably the location information indicates one or more of: the distance of the object from the handheld radar apparatus, the bearing of the object with respect to the handheld radar apparatus.

Preferably the screen displays indicia to indicate one or more of: the distance of the object from the handheld radar apparatus, the bearing of the object with respect to the handheld radar apparatus.

Preferably the radar is a solid state radar.

Preferably the electromagnetic signal generated by the radar is a frequency modulated continuous wave signal.

Preferably the handheld radar comprises a processor adapted to operate the screen to display the indicia at a position on the screen to represent the location of the object.

Preferably the processor is adapted to receive input indicative of the orientation of the antenna and adapted to operate the screen to display the indicia at a position on the screen such that the indicia is aligned with the actual position of the object that the indicia is indicative of based on the detected orientation of the object.

Preferably the processor is adapted to operate the screen to re-display the indicia at another position on the screen if the input indicative of the orientation of the antenna indicates the handheld radar has been removed, whereby re-displaying the indicia re-aligns the indicia with the actual position of the object that the indicia is indicative of based on the detected orientation of the object.

In another aspect, the present invention may be said to consist in a handheld radar apparatus comprising: an antenna adapted to transmit and receive electromagnetic signals, a direction sensor that outputs an orientation signal indicative of the orientation of the antenna, a radar coupled to the antenna, the radar adapted to generate an electromagnetic signal for transmission via the antenna, and adapted to receive a reflected version of the electromagnetic signal via the antenna reflected from an object, the radar comprising a processor for generating location information indicative of the location of the object using the received reflected electromagnetic signal and the orientation of the antenna as indicated by the orientation signal, and a screen adapted to display indicia representing the object and its location based on the location information, wherein the direction sensor comprises a fluxgate compass adapted to obtain a first measure indicative of the orientation of the antenna.

In another aspect, the invention may be said to consist in a handheld radar apparatus including: antenna means for transmitting and receiving electromagnetic signals, a radar means adapted to generate electromagnetic signals for transmission via the antenna means, and to detect one or more objects using a reflected signal received via the antenna means, and a display adapted to indicate the location of one or more objects detected by the radar means.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF DRAWINGS

Preferred embodiments of the invention will now be described with reference to the accompanying drawings, of which.

DETAILED DESCRIPTION OF THE PREFERRED EMBODIMENTS

Figure 1:
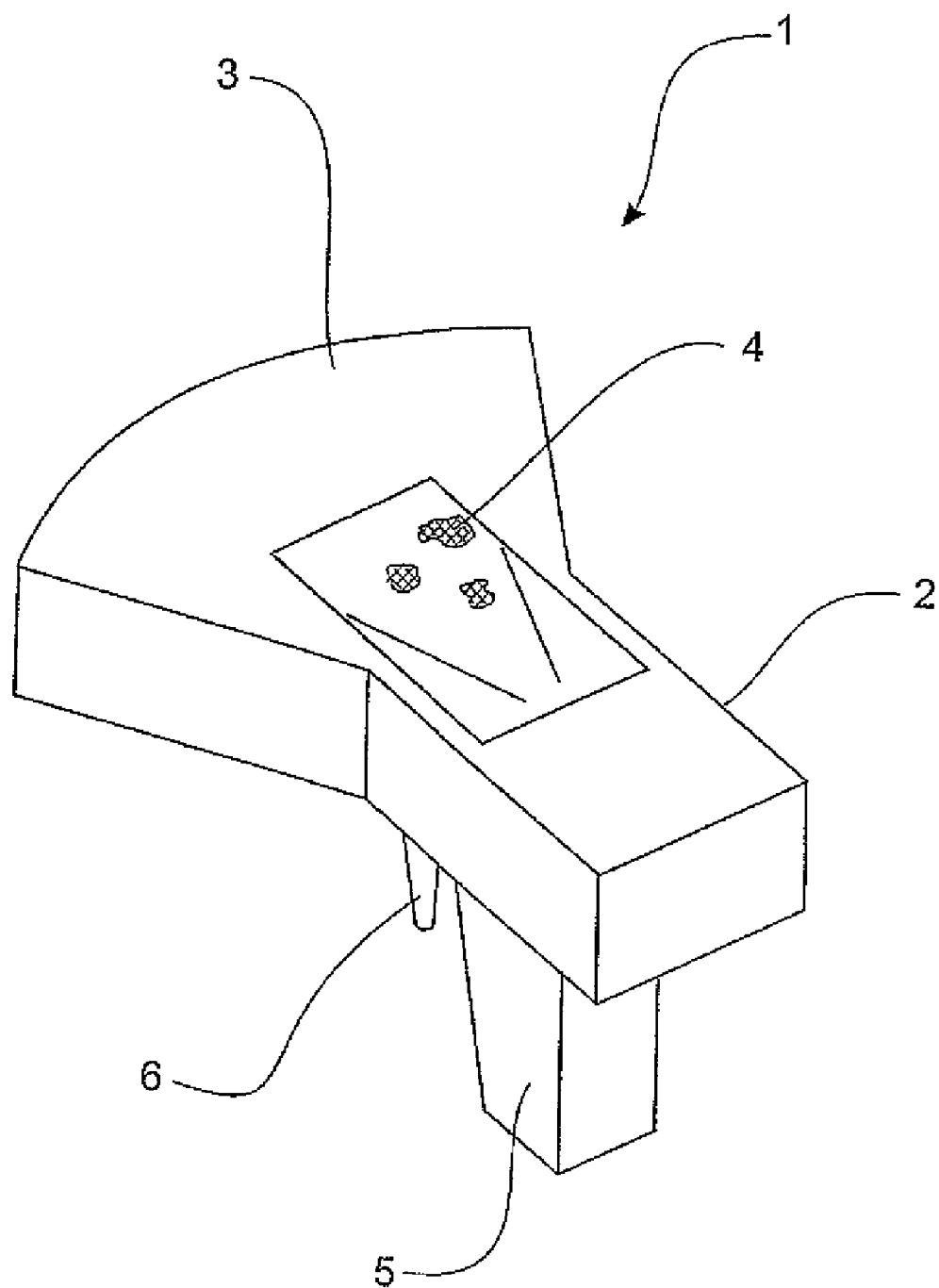
FIG. 1 is a perspective drawing of a handheld radar apparatus in accordance with one embodiment of the invention.

FIG. 1 shows in schematic form one possible embodiment of the external body of the handheld radar 1. The apparatus 1 comprises a body portion 2 for housing the electronic components of the radar that provide radar functionality. Protruding from the front of the body is an antenna cone 3 that houses both a transmission and reception antenna (not visible) for the electromagnetic signals that are transmitted from and received by the apparatus 1. The transmit and receive antenna may be integrated or separate components, as will be understood by those skilled in the art. The term "antenna" in this specification refers both possibilities. The dimensions of the antennas can be determined according to the requirements of the device using normal engineering principles. In one embodiment the antenna will be 8-10" providing a 10° beam width.

On the top surface of the body 2 of the device 1 is a display unit or screen 4 for displaying the location, size, and any other relevant information of objects in the region or "scene" being scanned by the handheld radar. The screen represents the objects detected by suitable indicia. These indicia might correspond to the actual shape/look of each object. Alternatively, the indicia might not emulate the look of an object, but rather be a symbol that represents the object. The position of the indicia on the screen indicates the location and size of the object. The screen might also display other indicia indicating speed or other attributes as necessary. Clearly, the radar could detect multiple objects and therefore display multiple indicia representing those objects.

The screen 4 can be of any suitable type known to those skilled in the art, such as a LCD, plasma or other suitable device. Preferably the screen 4 will be colour, which will enable additional information regarding the detected objects to be shown through the use of colour—for example, the speed that the objects are travelling. Many other possibilities will be known to those skilled in the art.

Attached to the bottom of the main body 2 is a pistol grip or other type of suitable handle means 5 for enabling a user to hold the device 1. In proximity to the handle 5 is a trigger 6 for activating the radar apparatus 1 when it is desired to scan a region.

The external components of the handheld radar 1 can be constructed from any suitable material, including plastics, metal, other materials or any suitable combination thereof.

Figure 2:
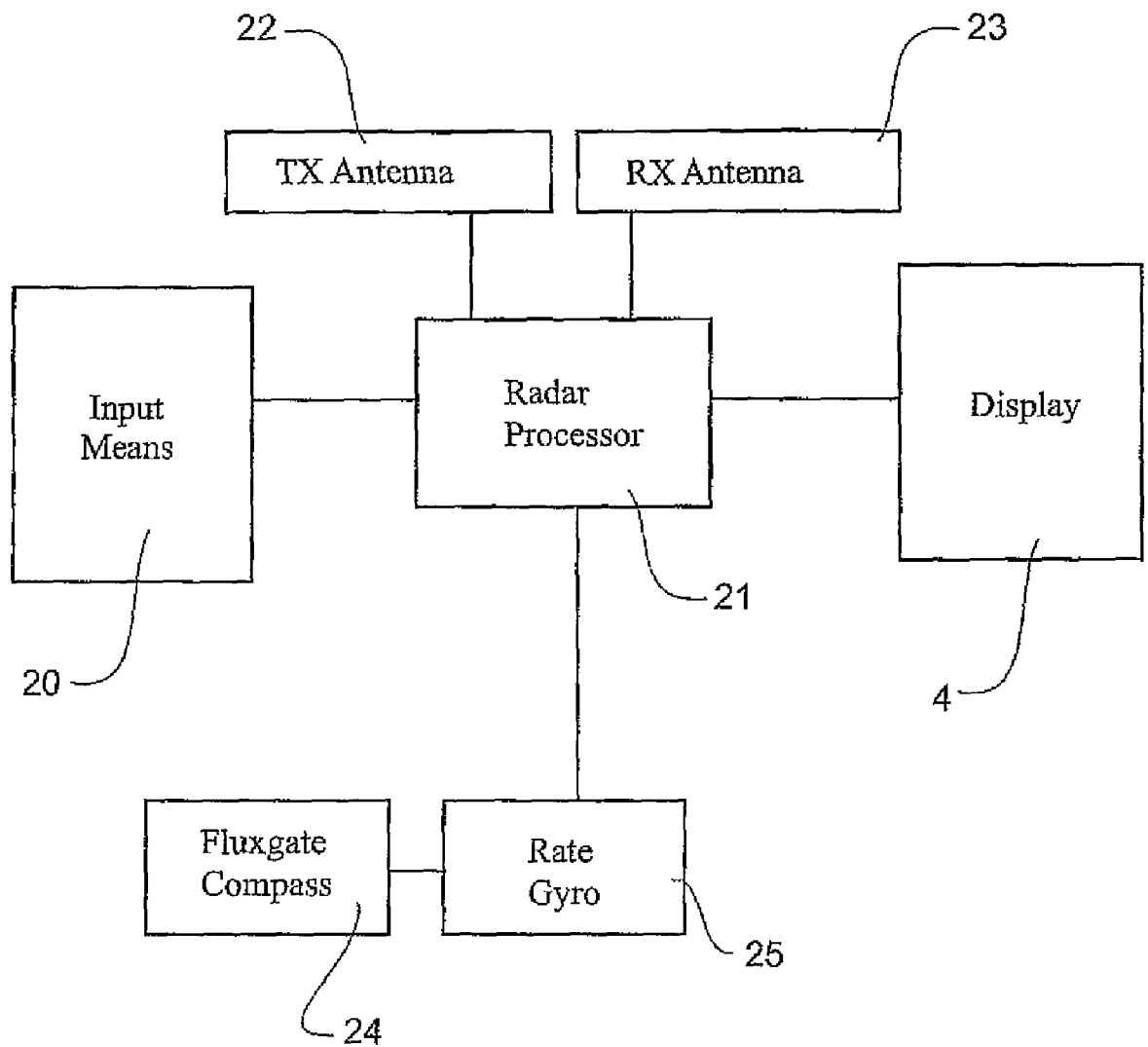
FIG. 2 is a block diagram showing the functional components of the handheld radar apparatus.

FIG. 2 shows a block diagram of the functional components housed in and on the radar body 2. The handheld radar 1 comprises input means 20 that comprise various controls for enabling a user to operate the device. These may comprise the trigger 6, keypads and other input devices for entering information and selecting options for operating the device. The input means 20 is connected to a radar processor 21. The radar processor conducts general control of the device, and also carries out the radar functionality, including generating transmission signals and processing reception signals to generate location information output indicative of the location of a detected object. That location information can be used to display information on the display unit 4 or screen indicating the location of objects. The term "location" can refer to any attribute that indicates the location of a detected object, such as range and bearing (both being with respect to the handheld radar). The radar processor 21 could operate the screen 4 directly, or the radar processor 21 could pass its generated output to another processor or similar, which could use the output to operate the screen 4 to display the indicia required to indicate the object based on the location information. The function of the radar processor 21 will be described in further detail with reference to FIG. 3.

Also connected to the radar processor are the transmit and receive antennas 22, 23. The transmit antenna 22 is for transmitting electromagnetic signals generated by the radar processor, and the receive antenna 23 is for receiving reflected versions of the transmit signals that have been reflected off objects in the region being scanned. The receive antenna 23 passes the received signals to the radar processor 21. Connected to the radar processor is a fluxgate compass 24 and rate gyroscope 25, which may be an integrated unit or separate components. These form a direction sensor. The fluxgate compass 24 provides or obtains a measure indicative of an absolute bearing/orientation/direction (used interchangeably) of the antenna 22/23 which is used by the radar processor 21 to determine the bearing of detected objects and the direction in which the handheld radar 1 (and more particularly the antenna 22/23) is being pointed. The rate gyroscope 25 is used to compensate for time lag in the fluxgate compass 24, so that the radar device 1 can detect quick changes in angular movement. The rate gyroscope 25 obtains a measure indicative of a relative bearing/orientation/direction of the antenna 22/23.

Figure 3:
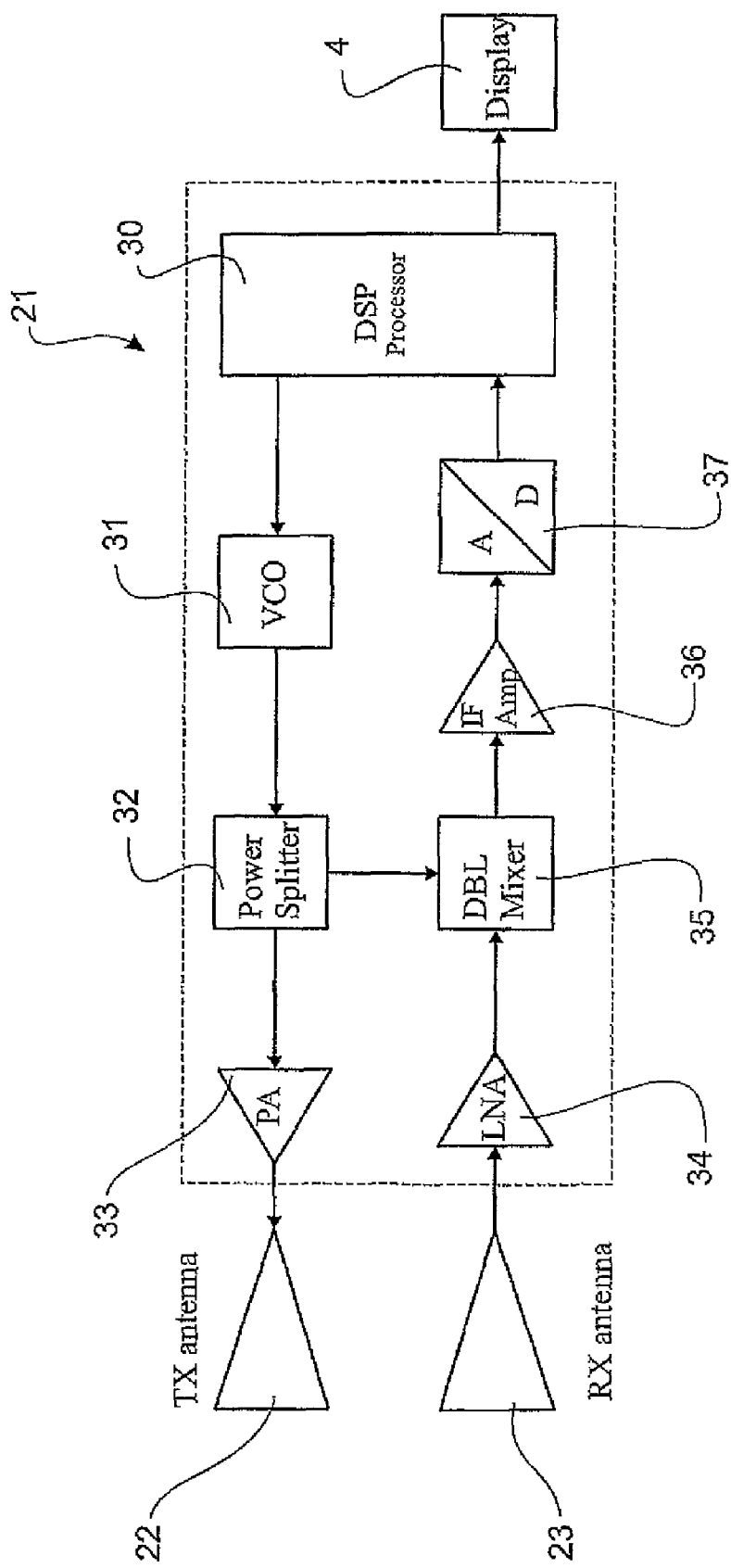
FIG. 3 is a block diagram showing the radar processor in more detail.

FIG. 3 shows a block diagram of one possible type of radar processor 21 that can be used in the handheld radar device according to the invention. It will be appreciated that any type of radar could be used in the device, including a magnetron providing pulse radar functionality, solid state radar providing pulse radar functionality, or a solid state radar providing frequency modulated continuous wave (FMCW) radar functionality. While any of these devices could be used, in the preferred embodiment a FMCW solid state radar processor is used. A solid state FMCW radar requires less power for operation than a pulse radar scheme, which requires a magnetron that utilises more power. Typically a magnetron might use in order of 1-2 kW of power, while a solid state radar implementing FMCW might use in the order of 1 W of power. Using FMCW provides the advantages of being more convenient and requiting less power, which is assists in making a handheld apparatus and a large power supply is not required.

FMCW radar functions by transmitting a frequency modulated continuous wave in which the frequency of the transmitted wave ramps up and down. When the radar processor receives a reflected version of the transmitted wave, it can determine the time it took for the reflection to arrive based on the difference between the frequency of the received signal and the current frequency of the transmit signal. From this, distance and speed of detected objects can be determined. It would also be possible to use other solid state modulation schemes such as CDMA, Phase-Shift-Keying or Frequency-Shift-Keying.

The fluxgate/gyroscope 24, 25 combination enables a spoke angle to be determined in a user operated handheld scan. Existing radar rely on a mechanical scan that provides exact knowledge of the direction of the radar based on a rotary encoder or other means such as counting stepper motor pulses. The fluxgate/gyroscope 24/25 negates the need for a rotary encoder. The fluxgate compass/rate gyroscope 24/25 outputs an orientation signal that is indicative of the current orientation/bearing of the antenna 22/23. This is orientation signal is used by the radar processor to determine the bearing of detected objects.

The fluxgate compass 24 finds the absolute bearing or direction in which the handheld apparatus is pointing. If the apparatus is moved rapidly, there can be a lag in determining the bearing which might mean the output of the compass is not sufficiently accurate. The rate gyroscope 25 provides compensation for this lag, such that when rapid movement or sweeping of the apparatus takes place, the bearing reading is accurate.

In an alternative, a fluxgate compass 24 could be used on its own. This would be suitable if the handheld radar is not moved too quickly, or if the output of the fluxgate compass 24 is deemed suitably accurate on its own. In another alternative, a rate gyroscope 25 could be used on its own. This would be suitable where the apparatus does not have to provide an absolute bearing, but rather only a bearing relative to the movement or position of the handheld radar itself. Other direction sensors could be used instead, such as a GPS compass or any other suitable device.

FIG. 3 shows the components of the FMCW radar processor 21 as indicated by the dotted line. The FMCW solid state radar 21 comprises a digital signal processor (DSP) 30 that controls the sweep frequency of the voltage controlled oscillator (VCO) 31. The output of the VCO is passed to a power splitter 32 and then onto a power amplifier 33 which outputs an electromagnetic signal. The power amplifier is coupled to the transmit antenna 22 for transmission of the FMCW radar signal. The receive antenna 23 receives a reflected version of the transmit electromagnetic signal reflected from an object in the scanning path and passes this to a low noise amplifier 34 in the radar processor 21 that amplifies the received microwave signal. This is passed to a double balanced mixer (DBL) 35 that mixes the current transmitter signal received by the power splitter 32 with the current received signal passed from the low noise amplifier 34. This mixing provides down conversion of the received signal to an intermediate frequency (IF). This signal is passed to the IF amplifier 36, which amplifies the down converted differential frequency and passes this signal to an analogue to digital converter (ADC) 37. The ADC digitises the analogue IF signal and passes this to the DSP 30.

The DSP carries out a fast Fourier transform (FFT) of the digitised IF signal to determine location of the detected objects. In the case of a radar using FMCW, the received signal will comprise reflected components, each relating to a reflected version of an electromagnetic signal that was reflected from an object in the scan region. By carrying out a FFT, the distance (from the radar apparatus) of these objects can be determined based on the frequencies of the FFT signal at which reflected signals occur. These frequencies can then be matched to direction information from the direction sensor to determine the bearing of the object. From this, the display 4 can be operated to display indicia indicating the range and bearing of detected objects.

Figure 4:
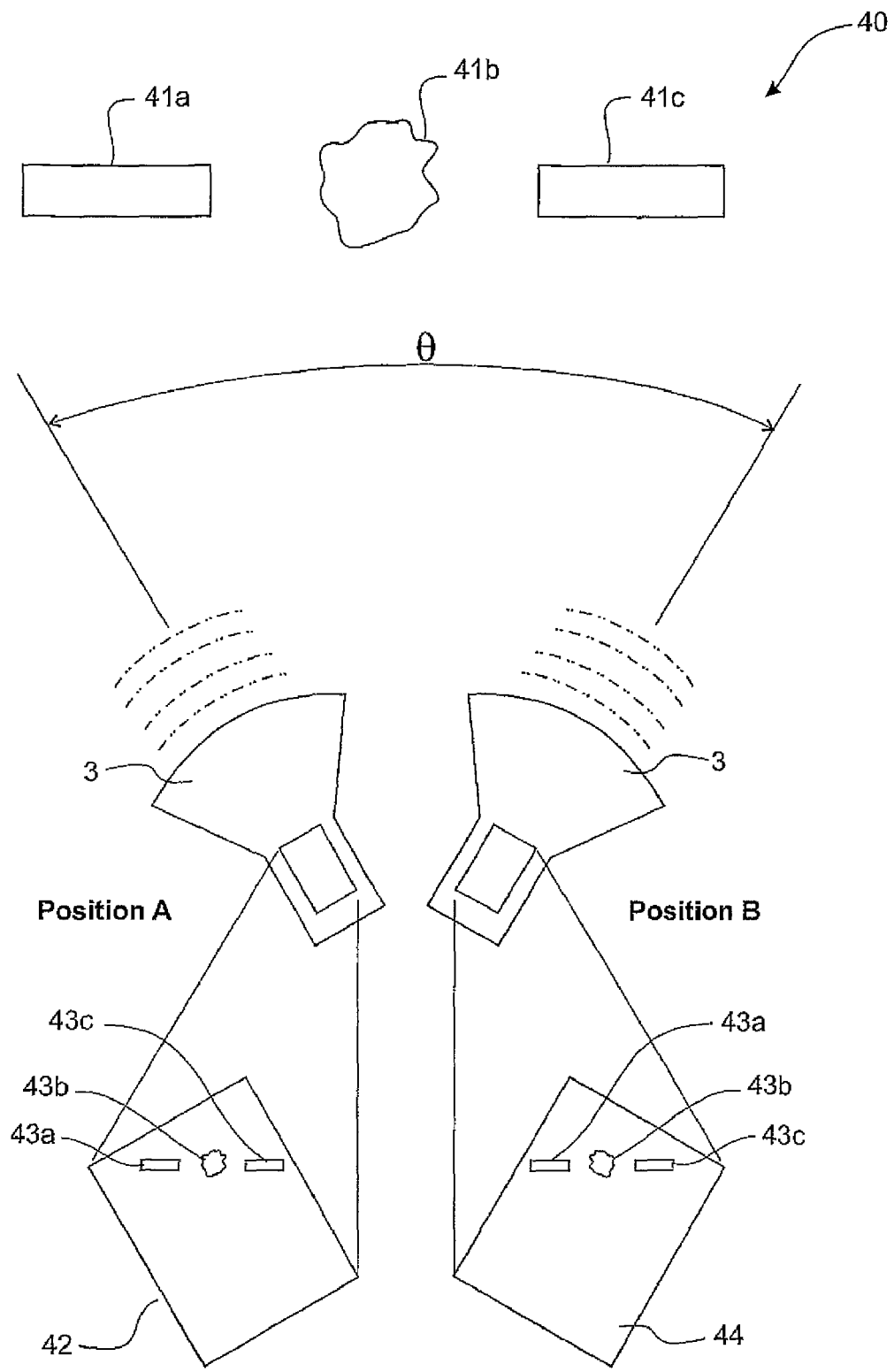
FIG. 4 is a schematic diagram indicating use of the apparatus.

A method of using the handheld radar 1 will now be described with reference to FIGS. 1 and 4. The handheld radar can be used in any suitable situation where the operator wants to avoid collisions, navigate or note the position of land and other physical objects. The radar could be used on a vessel for instance. FIG. 4 shows schematically a region 40 with various objects 41*a* to 41*c* (not to scale). In reality, the objects might be land, vessels, vehicles and other objects likely to be encountered by a person using the handheld radar. They are simply shown as schematic blocks in FIG. 4 for simplicity and clarity. The handheld radar and objects are not shown to scale.

In a situation where visibility is restricted, and the user wishes to determine which objects and physical features lie in the area of interest 40, the handheld radar 1 can be utilised. The user picks up the device 1 using the handle means 5 and the aims the antenna cone 3 generally in the direction of the area 40 to be scanned. The user then pulls the trigger 6 to activate the device and scans the area of interest 40 with the device 1 by slowly sweeping the antenna cone 3 in a rotational manner over the area of interest 40. As can be seen in FIG. 4, to scan region 40, the device 41 is scanned from position A to position B through an arc of angle θ.

As the device is scanned over the region 40, the solid state radar transmits a (preferably FMCW) electromagnetic signal through transmit antenna 22. The fluxgate compass 24 and gyroscope 25 keep track of the angular direction/bearing in which the antenna 22/23 is pointing and feeds this information to the radar processor 21. As the electromagnetic signal is transmitted, it will propagate through free space until it reaches an object. The detected object will create reflections of the electromagnetic signal. As the antenna 22/23 scans through angle θ it receives the reflected versions of the transmitted electromagnetic signal reflected from objects. The bearing of a detected object can be determined by the bearing of the antenna 22/23 at the time it receives the reflected electromagnetic signal. Due to the speed of propagation of the electromagnetic signal, this antenna bearing can be assumed to be the same as the antenna bearing when the signal was initially transmitted.

The time taken from transmitting the original signal to receiving the reflected signal can be used to determine the range (distance) of the object that reflected the signal from the antenna 22/23. When using FMCW, this can be determined by using the frequency difference between the received reflected signal and the electromagnetic signal currently being transmitted, which will indicate a time difference. The radar processor 21 can then process this information, and it or another processor can operate the screen to produce an image of the detected object e.g. 43*a* to 43*c* on the display 4. The processor operates the screen to display indicia that represent the object or objects detected, and positions the indicia on the screen to indicate the actual location of the objects. Indicia can indicate bearing, speed and other attributes also.

More particularly, when the area of interest 40 has been scanned, the trigger is released, and the radar processor or other processor generates the required location information output. This can then be used by the radar processor 21 or other processor to operate the screen to displays indicia 43*a* to 43*c* representing the detected objects 41*a* to 41*c* in their relative positions. The indicia are positioned on the screen to indicate the location (such as bearing and range) of the actual object. The position of the objects 41*a* to 41*c* indicated by indicia 43*a* to 43*b* on the display 4 will move as the device 1 is moved, in order to indicate their actual bearing and distance. Therefore, if the device 1 is rotated or moved in any manner, the positions of the indicia 43*a* to 43*c* on the display 4 will relocate to reflect their actual real life bearing and distance.

The processor will determine that the orientation of the antenna 22/23 has been moved by receiving input indicative of orientation of the antenna 22/23. This will come directly or indirectly from the direction sensor and the orientation signal. The processor will then operate the screen to re-align the indicia on the screen so that they still reflect the actual bearing of the actual object, the bearing being that determined by the direction sensor when the object was initially detected.

For example, referring to FIG. 4 the enlarged view of the screen of the handheld radar in position A is shown 42. In this position, the screen 4 is not pointing at object 41b but it is at an angle relative to it. However on the screen, the position of indicia 43b representing the object 41b is moved to retain it in alignment to the actual position in real life of object 41b. Similarly, referring to the enlarged version of the screen 44 when the device is in position B, while the screen itself has rotated to a different angular position, the position of indicia 43b on the screen is aligned such that it still relates to the actual position of the corresponding object 41b.

This feature of the screen enables the user to move the handheld device and still be aware of where the objects actually are. For example, a user might scan a region, and put the handheld radar down briefly, then pick up the handheld radar again to view the detected objects. Even if picked up so that the handheld radar faces in a different direction, the indicia 43a to 43b will be re-positioned on the screen to indicate the position of the objects.

It will also be appreciated, however, that the screen could be used in a static mode, whereby the range and bearing of a target could be inspected by the user without the target moving on the screen.

In addition the user can determine range, bearing and/or speed of objects either from information visually indicated or by the information presented in some alphanumeric form on the display.

What is claimed is:

1. A handheld radar apparatus comprising:
   an antenna adapted to transmit and receive electromagnetic signals, a direction sensor that outputs an orientation signal indicative of the orientation of the antenna,
   a radar coupled to the antenna, the radar adapted to generate an electromagnetic signal for transmission via the antenna, and adapted to receive a reflected version of the electromagnetic signal via the antenna reflected from an object, the radar comprising a processor for generating location information indicative of the location of the object using the received reflected electromagnetic signal and the orientation of the antenna as indicated by the orientation signal, and
   a screen adapted to display indicia representing the object and its location based on the location information,
   wherein the direction sensor comprises a fluxgate compass adapted to obtain a first measure indicative of the orientation of the antenna, and
   a rate gyroscope adapted to obtain a second measure indicative of the orientation of the antenna,
   wherein the fluxgate compass and rate gyroscope in combination provide an orientation signal that adapts to rapid movements of the handheld radar by a user.

2. A handheld radar apparatus according to claim 1 wherein the location information indicates one or more of:
   the distance of the object from the handheld radar apparatus,
   the bearing of the object with respect to the handheld radar apparatus.

3. A handheld radar according to claim 2 wherein the screen displays indicia to indicate one or more of:
   the distance of the object from the handheld radar apparatus,
   the bearing of the object with respect to the handheld radar apparatus.

4. A handheld radar according to claim 1 wherein the screen displays indicia to indicate one or more of:
   the distance of the object from the handheld radar apparatus,
   the bearing of the object with respect to the handheld radar apparatus.

5. A handheld radar according to claim 1 wherein the radar is a solid state radar.

6. A handheld radar according to claim 1 wherein the electromagnetic signal generated by the radar is a frequency modulated continuous wave signal.

7. A handheld radar apparatus according to claim 1 comprising a processor adapted to operate the screen to display the indicia at a position on the screen to represent the location of the object.

8. A handheld radar apparatus according to claim 1 wherein the processor is adapted to receive input indicative of the orientation of the antenna and adapted to operate the screen to display the indicia at a position on the screen such that the indicia is aligned with the actual position of the object that the indicia is indicative of based on the detected orientation of the object.

9. A handheld radar apparatus according to claim 8 wherein the processor is adapted to operate the screen to re-display the indicia at another position on the screen if the input indicative of the orientation of the antenna indicates the handheld radar has been moved, whereby re-displaying the indicia re-aligns the indicia with the actual position of the object that the indicia is indicative of based on the detected orientation of the object.

10. A handheld radar apparatus according to claim 1 wherein the first measure obtained by the fluxgate compass is indicative of the absolute orientation of the antenna, and the second measure obtained by the rate gyroscope is indicative of the relative orientation of the antenna, wherein the second measure obtained by the rate gyroscope compensates for errors in the first measure indicative of the absolute orientation of the antenna due to lag in the fluxgate compass.

11. A handheld radar apparatus according to claim 10 wherein the location information indicates one or more of:
    the distance of the object from the handheld radar apparatus,
    the bearing of the object with respect to the handheld radar apparatus.

12. A handheld radar according to claim 10 wherein the screen displays indicia to indicate one or more of:
    the distance of the object from the handheld radar apparatus,
    the bearing of the object with respect to the handheld radar apparatus.

13. A handheld radar apparatus comprising:
    an antenna adapted to transmit and receive electromagnetic signals,
    a direction sensor that outputs an orientation signal indicative of the orientation of the antenna,
    a radar coupled to the antenna, the radar adapted to generate an electromagnetic signal for transmission via the antenna, and adapted to receive a reflected version of the electromagnetic signal via the antenna reflected from an object, the radar comprising a processor for generating location information indicative of the location of the object using the received reflected electromagnetic signal and the orientation of the antenna as indicated by the orientation signal and
    a screen adapted to display indicia representing the object and its location based on the location information,
    wherein the direction sensor comprises a fluxgate compass adapted to obtain a first measure indicative of the orientation of the antenna.

* * * * *